Patented Dec. 16, 1941

2,266,051

UNITED STATES PATENT OFFICE 2,266,051

MANUFACTURE OF CONFECTIONS

Herman Lebeson, Chicago, Ill.

No Drawing. Application March 6, 1940,
Serial No. 322,575

10 Claims. (Cl. 99—134)

This invention is concerned with the preparation of jelly or gum confections of the type usually made from sugar or mixtures of different sugars, corn syrup and so-called thick or thin boiling starches.

These jelly or gum confections, which include, among others, gum drops, jelly beans, autumn leaves, Turkish pastes, orange, lemon and pineapple slices, and the like are conventionally prepared by mixing together sucrose, corn syrup, starch, cream of tartar or a fruit acid, and water, and cooking the mixture to the desired consistency as evidenced by a certain "stringiness" of the cooked mass, usual at a point where the moisture content is in the neighborhood of 25% to 30%. The cooked mass is then deposited or cast, by means of depositing or casting machines, into starch molds, or spread on a cooling table.

The starch used for boiling with the sugar, corn syrup and other ingredients is either the regular thick boiling starch or the thin boiling starch. The latter type of product is almost universally used in the manufacture of cast gum confections since it cooks up rapidly, that is, the water boils out quickly from a batch made therewith, and provides a cooked batch with a lower viscosity than is obtained with the regular thick boiling starch, a desideratum particularly where casting or depositing machines are utilized. The cream of tartar, or fruit acid such as tartaric acid or citric acid, is conventionally utilized in the batch for the purpose of breaking down the starch to an extent further than that which would be obtained merely by the cooking operation, the result being to increase the speed with which moisture is boiled out of the batch. The use of cream of tartar or fruit acids serves to provide a more freely flowing cooked batch and is especially important where depositing or casting machines are used to deposit the cooked batch in starch molds since such machines must handle the batch quickly and without the formation of so-called "strings."

The thin boiling starches which have, in the past, been conventionally used in the preparation of cast gum confections are products of the wet milling processing of corn and result from the conversion or modification, in a wet or dry condition, of the regular thick boiling starches by a chemical process by means of acids, alkalies, oxidizing agents such as sodium hypochlorite, and the like. As a result of such treatment, the regular thick boiling starches undergo certain physical and chemical changes which modify the cell structure of the products and convert the same into thin boiling starches.

It has been discovered that important advantages in the manufacture of gum confections, of the character referred to hereinabove, are brought about through the use of diastatic enzymes, especially when coupled with the utilization, in whole or in at least large part, of certain corn products as described in detail hereinafter.

The improvements resulting from the practice of the present invention are manifold but, in the main, they may be listed as follows:

(1) The gum confections produced are very tender and possess highly desirable chewing characteristics.

(2) The finished gum confections retain their moisture content for long periods of time and, therefore, have a substantial shelf life.

(3) The process of preparing the gum confections requires less time, labor and steam in that much less water is required in the candy batch and, therefore, the amount of water required to be evaporated is correspondingly less.

(4) Despite the decreased moisture content of the gum confection batch as the same is removed from the kettle, the fluidity of the batch is quite high and the latter is easily cast into starch molds by the depositing machines without the formation of the so-called "tailings."

(5) The gum confections have exceptionally satisfactory transparency and brilliancy.

(6) There is a material saving in time in getting the gum confections of the present invention ready for packing and distribution after deposition in the starch molds. Thus, for example, in many cases only one and one-half to two days need elapse before the surplus moisture is abstracted from the gum drops when the latter are disposed in the starch trays instead of the usual lapse of three to four days. Furthermore, the gum confection may be kept in the starch molds at room temperatures rather than the usual temperature of about 130 degrees F.- 140 degrees F. and at the same time be ready for "sanding" within from twenty-four to forty-eight hours.

In accordance with the present invention, a starchy material such as corn starch or other starches such as potato, sago, tapioca, and sweet potato, or certain corn products, as hereinafter described, or mixtures of starch and said corn products, is modified or partially converted by means of a diastatic enzyme, the conversion being preferably effected in the candy kettle in which the batch is cooked and as an incident in the process of manufacturing the gum confections. In general, the starch or starchy material is mixed with a diastatic enzyme in powder form or a material having a high diastatic activity and the mixture is suspended in water and heated to a temperature which is, preferably, that at which the diastatic enzyme exerts its optimum activity. Alternatively, the starch or starchy material may be suspended in water and the diastatic enzyme added to the suspension. The amount of the diastatic enzyme utilized is, of course, variable, depending, among other things, upon the particular activity thereof, the precise conditions under which it is utilized, and the exact results sought. As a general rule, from about 0.01% to 1.0%, based on the weight of the starchy material, is satisfactory. The particle size or form of the starchy material is not critical, so-called pure food starches, which are finely powdered, or pearl starch, which is a conglomerate of starch particles, being utilizable with excellent results.

The diastatic or amylolytic enzymes may be derived from various sources such as malt, molds, fungi, and bacteria, it being understood that the temperature and pH tolerance of said enzymes may vary within a relatively wide range. For the practice of the present invention, bacterial amylases such as are obtained from B. subtilis are particularly preferred. In general, the optimum results are obtained with enzyme preparations which contain a preponderance of alpha-amylase over beta-amylase, the object being to liquefy the starch or starchy material but without effecting the conversion thereof to such an extent as will adversely affect its setting or jelling characteristics. The diastase complex effects a liquefying of the starch, the other actions which take place simultaneously being a cleavage of the starch to dextrin by the dextrinogenic enzyme alpha-amylase, and saccharification by the beta-amylase. The ratio of dextrin to maltose, which form as a result of the conversion process, is variable, depending among other things, upon the temperature and pH under which said conversion is carried out.

The partially converted starch or starchy material, produced as described in general hereinabove, is then heated to a temperature sufficiently high to destroy the enzyme. It should be noted that the saccharifying enzyme is readily destroyed at 70 degrees C. while the activity of the liquefying and dextrinizing enzyme increases greatly between 70 degrees C. and 90 degrees C. After the destruction of the enzymes, the proper amounts of sugar and corn syrup or other sugars and ingredients are added, the batch is cooked to the desired "string" and is handled, in general, in a manner well known in the art. It will be understood that the order of steps may be varied. Thus, for example, the sugar, corn syrup, water, starchy material, and enzyme may be brought together and the conversion thus effected in the presence of said ingredients. Other variations are indicated in the following examples and still others will occur to those skilled in the art in the light of the teachings herein. It will be understood that said examples are to be interpreted in an illustrative rather than a restricted sense, variations in ingredients, temperatures, proportions and the like being evident without departing from the spirit of the invention.

*Example I*

27.5 lbs. starch containing 0.025% of a very active diastase preparation are suspended in 28 gallons of water and poured into a jacketed kettle. The steam is turned on in the jacket and the temperature is brought to 180 degrees F. in 5 minutes while agitating the mass. During this time, the starch is sufficiently modified, and the action of the enzymes is then stopped by rapidly bringing the mass to a boil. 125 lbs. of cane sugar and 125 lbs. of corn syrup are then added and the entire batch is cooked to a "string." The steam is then shut off and color and flavor added. The resulting mass is then poured into a depositor from which it is pumped into starch molds. After the gum jellies have been deposited, the trays are set aside to dry in a room in which the temperature is maintained at 130 degrees F. to 140 degrees F. and wherein the air is constantly changed in order to remove excess moisture from the gum jellies. Within about two days, the gum jellies will have set to a firm consistency. They are then removed from the molds, cooled, sieved, brushed free of starch, and then coated or covered with sugar crystals in the conventional manner.

*Example II*

125 lbs. cane sugar and 125 lbs. corn syrup are dissolved in 7 gallons water and brought to a boil. To this sugar-syrup solution 10 gallons water are then added to bring the temperature to 130 degrees F.–150 degrees F.; 28 lbs. of starch containing 0.040% of the preferred enzyme preparation are suspended in 10 gallons of water and the resulting suspension is added to the sugar, syrup solution. The whole is brought to a boil in 7 to 10 minutes and cooked to a string. The steam is then shut off and the batch is then colored, flavored and mixed well.

*Example III*

27½ lbs. of starch containing 0.025% of the preferred enzyme preparation are suspended in 140 lbs. of water; 125 lbs. of can sugar are added to the starch suspension in the kettle, and the steam is turned on in the jacket. A temperature of 180 degrees F. is reached in 6 to 7 minutes. The batch is then rapidly brought to a boil in another 2 minutes, and 65 lbs. of corn syrup are then added and the mass is cooked to a "string." The steam is then shut off and another 60 lbs. of corn syrup are added, followed by the addition of color and flavor.

*Example IV*

27½ lbs. of starch containing 0.025% of the preferred enzyme preparation are suspended in 140 lbs. of water. The steam is admitted to the jacket at such a rate that the temperature of the starch suspension reaches 175 degrees F. in 5 minutes. It is then brought to a boil within 2 minutes and 150 lbs. of corn syrup are added. The whole is cooked to a string and 100 lbs. of can sugar added.

In my copending application, Serial No. 312,337, filed January 4, 1940, the employment in gum confections of certain modified corn products is fully described and important advantages are shown to result from the utilization thereof. Such corn products, as described in said copending application, are derived from de-hulled, degermed corn, preferably in the form of grits, and comprise a protein-containing, gelatinized and dextrinized material wherein the gelatinization and dextrinization result from the application of heat and mechanical pressure to said corn products. At least most of the starch cells of said products are disrupted and, when viewed under the microscope, there is a lack of well-defined starch granules but in their place are burst granules devoid of any regular pattern or shape. Such corn products may be employed with excellent results in accordance with the present invention, being utilizable either as the sole starchy material of the gum confections or in admixture with from 25% to 75%, preferably about 50%, of ordinary starch such as corn starch. While, as indicated hereinabove, and as pointed out in detail in said copending application, many advantages result from the use of said corn products, the practice of the present invention brings about additional improvements when said latter products are employed, notably with respect to enhancement in the transparency of the finished gum confections.

The starchy material may be distributed in admixture with the enzyme in powdered form and and with or without a small amount of cream of tartar or the fruit acids which are employed as so-called "doctors" in the preparation of the gum confections. As indicated previously, highly effective compositions comprise mixtures of starch and the modified corn product together with a minor proportion of the diastatic enzyme material, with or without cream of tartar or the like.

In the examples set forth hereinabove, the starch employed was the ordinary corn starch. However, as indicated previously, other starches as well as starchy materials may be employed with satisfactory results.

It has also been found to be highly advantageous in certain instances to utilize sodium bisulphite or peroxides such as calcium peroxide or magnesium peroxide which bring about a better appearance of the gum confection. These peroxides also function to enhance the activity of the diastatic enzymes. Small proportions, of the order of about 0.01% to 0.1%, based on the weight of the starch or starchy material, are satisfactory. The sodium bisulphite or the peroxides may be incorporated with the starch or starchy material and diastatic enzyme to provide a dry composition. Where hydrogen peroxide is employed, it is added to the batch at any desired stage of the process.

In addition to the several advantages which were pointed out hereinabove, resulting from the practice of the present invention, it should also be pointed out that a still further and important advantage resides in the fact that the practice of the process produces an appreciable amount of maltose as a result of the action of the diastase on the starch as well as the dextrins present in corn syrup when the latter is employed as one of the sugars of the gum confection. The result is that, with a given sugar content, a sweeter confection is produced than in the case of the prior art confections utilizing the same proportion of sugars. Alternatively, the practice of the process results in economies in that the amount of sugar normally used in a gum confection formula can be appreciably decreased, the deficiency being made up by the maltose produced by the action of the diastatic enzymes.

What I claim as new and desire to protect by Letters Patent of the United States is:

1. A method of making gum confections which comprises subjecting an aqueous dispersion of a starchy material to the action of an added diastatic enzyme partially to convert said starchy material, heating the resulting mass to a temperature sufficient to effect destruction of the enzyme, and cooking said mass together with at least one sugar.

2. A method of making gum confections which includes the steps of partially converting an aqueous suspension of a starchy material by means of an added diastatic enzyme, effecting the destruction of the activity of said enzyme after it has accomplished said partial conversion, and cooking the same with at least one sugar in the presence of water.

3. A method of making gum confections which includes the steps of subjecting an aqueous dispersion of a gelatinized and dextrinized de-hulled and de-germinated corn, to the action of an added diastatic enzyme partially to convert said corn, heating to temperature sufficient to effect destruction of the enzyme after it has accomplished said partial conversion, and cooking the same with an aqueous solution of sugar and corn syrup.

4. The method of making gum confections which comprises forming an aqueous dispersion of a mixture of starch and a gelatinized and dextrinized de-hulled and de-germinated corn, partially converting said material by subjecting the same to the action of an added diastatic enzyme, and cooking the resulting product with at least one sugar, the enzyme being destroyed after it has accomplished the partial conversion.

5. A method of making gum confections which includes the steps of partially converting an aqueous suspension of a starchy material by means of an added diastatic enzyme and cooking the resulting partially converted starchy material with at least one sugar.

6. A gum confection composition for use in the preparation of gum confectionery, said composition containing a gelatinized and dextrinized de-hulled and de-germinated corn, and a minor proportion of an added material having high diastatic activity.

7. A gum confection composition for use in the preparation of gum confectionery, said composition containing starch, a minor proportion of an added material having high diastatic activity, and a gelatinized and dextrinized de-hulled and de-germinated corn and at least most of the starch cells of said corn being disrupted, said corn having the capacity of absorbing from six to about twelve times its own weight of water and being characterized, when viewed under the microscope, by a lack of well-defined starch granules but having in their place burst granules devoid of any regular pattern or shape.

8. A gum confection composition for use in the preparation of gum confectionery, said composition containing a starchy material and minor proportions of an added diastatic enzyme and a material selected from the group consisting of cream of tartar and fruit acids.

9. A method of making gum confections which includes the steps of partially converting an aqueous suspension of a starchy material by means of an added diastatic enzyme in which there is a substantial preponderance of alpha-amylase over beta-amylase, effecting the destruction of the activity of said enzyme after it has accomplished said partial conversion, and in cooking the same with at least one sugar in the presence of water.

10. A gum confection composition for use in the preparation of gum confectionery, said composition containing a gelatinized and dextrinized de-hulled and de-germinated corn, and a minor proportion of an added diastatic enzyme having a substantial preponderance of alpha-amylase over beta-amylase.

HERMAN LEBESON.